INVENTORS.
GEORGE M. TOKOS
EDWARD G. TONN

BY Robert E. Howard

ATTORNEY

United States Patent Office 3,547,754
Patented Dec. 15, 1970

3,547,754
THERMOPLASTIC PACKAGING FILMS HAVING A DIFFERENCE IN SLIP CHARACTERISTICS BETWEEN THEIR TWO OUTER SURFACES
George M. Tokos, Dublin, and Edward G. Tonn, Oakland, Calif., assignors to Crown Zellerbach Corporation, San Francisco, Calif., a corporation of Nevada
Filed Oct. 1, 1965, Ser. No. 492,211
Int. Cl. B32b 27/08, 27/18
U.S. Cl. 161—165                    7 Claims

ABSTRACT OF THE DISCLOSURE

A thermoplastic packaging film having a difference in slip characteristics between the two outer surfaces thereof, one surface being relatively smooth having a static coefficient of friction less than about 0.8 and the other surface being relatively non-smooth or tacky having a static coefficient of friction at least about 0.4 greater than the smooth outer surface.

This invention relates to thermoplastic films useful in packaging various items, and particularly as a packaging material for bread.

At the present time various clear films are employed for the overwrapping of bread. Cellophane is one of the oldest of the clear films employed for this purpose. More recently, various thermoplastic films have been employed successfully for the overwrapping of bread. Thus, polyethylene has been employed for about seven years as a breadwrap film, and recently polypropylene has been employed. While these latter films are all employed successfully on the standard breadwrapping machinery, there are certain problems associated with their employment on high speed breadwrap machinery that would be desirable to overcome. One of the principal problems with the overwrapping of almost any type of article with thermoplastic film is the poor "machinability" characteristics of the film. As employed herein, the term "machinability" is defined as the ability of a film to fold neatly and uniformly and maintain the folded position while passing through the folding and heat sealing stations of an overwrap machine without drag-back or pull-out of any of the overlapped folds. As a loaf of bread is moved through an overwrap machine, such as that described in U.S. Pat. No. 3,064,-403, there is formed an overlapped longitudinal seam along the bottom portion of the loaf, and at various stations in the breadwrap machine overlapped folds are placed in the ends of the loaf. After all these overlaps have been made, the loaf is presented at a heat sealing station where the overlapped portions are heat sealed. However, until the heat sealing operation is effected, the loaf must move through the bread wrapping machinery and maintain the overlapped portions in position until all the folds have been made and the heat sealing station is reached. Due to the friction between the bread wrap machinery surfaces and the overwrapped film, there is a force acting against the overlapped portions tending to pull them out of position. Both stiffness and slip of a film are important characteristics and have a definite effect on the machinability characteristics of the film. Cellulosic films such as cellophane are very high in stiffness, and as a result fold neatly and uniformly with very little pull-out or drag-back of overlapped portions. The slip property of cellophane is not considered critical because the stiffness of the film holds the folds in place and will overcome a reasonably high degree of drag between the cellophane and the folding line surfaces. Some thermoplastic films, and low density polyethylene in particular, do not have a high order of stiffness and, therefore, the slip property of these films becomes important. The lack of stiffness of some of these films means that any drag between the film and the folding line surfaces may result in pull-out or drag-back of the folds, and results in a sloppy package appearance. To overcome this friction, various expedients have been employed such as adding slip additives to the film. However, the slip additive blooms to both surfaces of the film which renders both surfaces of the film slippery. While this is desirable with respect to the surface of the film that is to be presented to the bread wrap machinery, it is not desirable with respect to the surfaces which are folded into contact with each other. This is because the folds tend to lose position easily since there is no film-to-film tack to hold them in place due to high slip.

Other problems associated with the overwrapping of articles with polyolefin films are the narrow heat sealing temperature range of both polyethylene and polypropylene, and the lack of low temperature impact strength of polypropylene, and the lack of low temperature impact strength of polypropylene films. Due to the narrow heat sealing temperature range of these films, the control of the temperature of the heat sealing elements in a bread wrap machine becomes extremely critical and any deviation therefrom either results in lack of a seal or burn-through. Since heat sealing is dependent upon pressure as well as temperature, results in pressure variations due to the irregular shape of bread loaves add to the heat sealing problems. The lack of low temperature impact strength of polypropylene films renders these films difficult to employ during the winter time without the addition of large amounts of plasticizer because of the high degree of brittleness of polypropylene at low temperatures.

It is the principal object of this invention, therefore, to provide a thermoplastic film which is useful for the overwrapping of articles and which overcomes the difficulties heretofore attendant with the use of various polyolefin films as described above.

This and other objects will become apparent from the following description, and by reference to the accompanying drawing in which.

Figure 1:
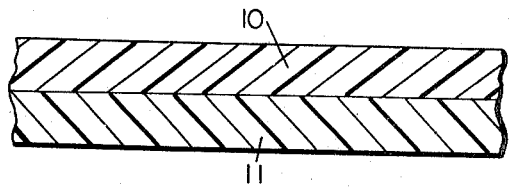
FIG. 1 is a schematic sectional view of a bilaminate film having differential slip characteristics.

The present invention provides a thermoplastic film which has a high slip surface on one side thereof and a low slip or tacky surface on the other side thereof to provide differential slip characteristics which result in optimum machinability of the film on overwrap packaging machinery. The films described herein are particularly adapted for bread wrappers for use on conventional bread wrapping machinery, but it is to be understood that they may be employed in overwrapping other articles. Therefore, in the description contained herein where bread alone is referred to as the article, it is intended that other articles are also applicable.

Herein, when a film surface is described as having a high slip or a low slip, it is meant that the film surface has a low coefficient of friction or a high coefficient of friction, respectively. Thus, it is seen that in a sense "slip" is the antithesis of friction in that high coefficient of friction denotes poor or low slip, and low coefficient of friction denotes good or high slip. Coefficient of friction is a measure of the relative difficulty with which the surface of one material will slide over an adjoining surface of itself or of another material. There are two kinds of friction measured. Static friction is the resistance opposing the force required to start to move one surface over another, and dynamic friction is the resistance opposing the force required to move one surface over another with a variable, fixed or predetermined speed. The coefficient of friction measurements given herein, unless otherwise specified, were obtained on a Thwing-Albert Egan slip tester which measures the coefficient of friction of thermoplastic film surfaces in accordance with ASTM Standard Test D1894-61 T.

While the particular process employed in manufacturing the multilaminate thermoplastic films described herein forms no part of the present invention, and may be any of the processes conventionally employed in the art such as coating one resin onto a resin film, laminating together freshly extruded films, and others, a particularly advantageous procedure is that disclosed in copending application, Ser. No. 492,212, now abandoned, filed of even date herewith. In the procedure described in copending application, Ser. No. 492,212, a method is described wherein a plurality of resin layers are extruded simultaneously from a single die. This latter procedure permits making relatively thin multilaminate thermoplastic films on the order of 1 mil in thickness which is important as it frequently becomes uneconomical to employ films having a thickness greater than about 1.25 mils as a bread wrap.

The multilaminate thermoplastic films which have the necessary characteristic of having high slip characteristics on one surface and low slip characteristics on the other surface thereof may have any number of laminae as long as the outer laminae have outer surfaces which meet this requirement. The outer surface of the "high slip" lamina should have a coefficient of friction sufficiently low that it runs smoothly in contact with a surface such as is presented in wrapping machinery. The outer surface of the "low slip" lamina should have a coefficient of friction that is sufficiently high that it is somewhat tacky and has a tendency to cling to the high slip side when brought into contact therewith. It has been found that the high slip surface should have a static coefficient of friction of less than about 0.7 to 0.8, and desirably a coefficient of friction of less than about 0.4 to 0.5 in order to obtain good slip between this surface and the surfaces of the overwrap machinery. If the overwrap machinery has clean surfaces, a coefficient of friction of less than about 0.7 to 0.8 may be employed on a high slip side. However, if the machine surfaces have a normal accumulation of miscellaneous deposits, the coefficient of friction on the high slip side should be less than about 0.4 to 0.5. The coefficient of friction of the low slip side should be greater by at least 0.4 and desirably 0.8 or more than the coefficient of friction of the high slip side in order to obtain the tacky characteristics required for holding the overlapped bottom seam in place during movement of the overwrap package through the wrapping machinery.

The high slip characteristics for the surface of the film that is to contact the bread wrapping machinery is most advantageously obtained by employing a slip additive in that lamina. The term "slip additive" is defined as meaning any additive which imparts the characteristic of relatively low coefficient of friction to a cast film of thermoplastic resin. Slip additives have the characteristic of blooming or exuding to the surface of a film, thereby lubricating it. When a slip additive has bloomed to the surface of a film it is said to be developed. In order to increase the rate and uniformity of development of slip additives, it is desirable to employ antiblock agents. With too little antiblock agent, the slip additive is not developed uniformly throughout a roll of film. With too much antiblock agent, the film tends to become grainy and unsatisfactory optically. The optimum amount must be determined on an ad hoc basis for each film configuration. Suitable slip additives are the fatty amide types, and especially erucyl amide and mixtures of erucyl amide with other fatty amides.

Suitable antiblock agents are diatomaceous earth and finely divided silica.

Examples of resins suitable for employment as the high slip lamina are the polyolefins such as low and medium density polyethylene and polypropylene, and propylene copolymers such as Avisun TD 314, Enjay CD 251, and Hercules SA-511.

The high slip of the surface that is to contact the wrapping machinery is most desirably obtained by adding a slip additive to that lamina, as described above, because the slip additive blooms the surface of that lamina and comes off on the wrapping machinery surfaces which aids in lubricating the motion of the film through the bread wrapping machinery. However, high slip may be obtained by other expedients, such as coating one side of the film with a coating having high slip characteristics; one of the surfaces of the film could be physically or chemically treated to change the surface characteristics to give high slip such as dusting one surface with a powder, embossing, abrading, etching, etc. However, these latter expedients may impart decreased optical properties to the film which is sometimes undesirable.

The tacky or low slip surface is obtained by employing a resin for this lamina that has a high coefficient of friction as one of its physical properties. Therefore, any resin which yields films having high coefficient of friction and which is readily heat sealable to the particular high slip lamina employed is suitable for employment as the low slip lamina of the films described herein. Examples of suitable thermoplastic resins which possess suitably high coefficient of friction characteristics are low density polyethylene, and copolymers of an olefin monomer such as ethylene or propylene with an ethylenically unsaturated ester such as vinyl acetate, ethyl acrylate, methyl acrylate and methyl methacrylate.

The resins suitable for employment as the various intermediate laminae of the multilaminate thermoplastic films described herein are desirably those having good optical characteristics, i.e., those which yield clear films, such as the various olefin homopolymers and copolymers. Low and medium density polyethylene homopolymers, polypropylene homopolymers, propylene copolymers, and the olefin-ethylenically unsaturated ester copolymers enumerated above are examples of such suitable resins. Low density polyethylenes are those having a density of from 0.910 to 0.925 gm./cc. Medium density polyethylenes are those having a density of from 0.926 to 0.940 gm./cc.

The polymers described herein may be put together in various configurations to give films having any number of laminae greater than two as long as one of the two outer laminae has a surface which has high slip characteristics and the other outer lamina has an outer surface which has low slip characteristics, as previously described. Examples of suitable configurations are illustrated in FIGS. 1 to 3.

FIG. 1 illustrates a bilaminate film wherein lamina 10 is the high slip lamina and lamina 11 is the low slip lamina.

Examples of bilaminate film constructions are: Low or medium density polyethylenes as the high slip laminae with ethylenevinyl acetate as the low slip laminae; propylene copolymer or polypropylene homopolymer as the high slip lamina with ethylenevinyl acetate as the low slip laminae; and medium density polyethylene as the high slip laminae with low density polyethylene as the low slip laminae.

Figure 2:
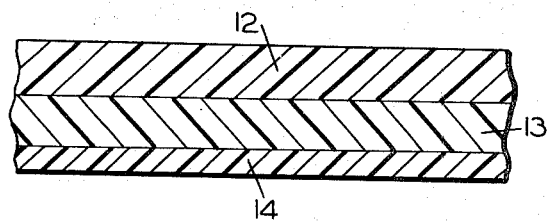
FIG. 2 is a schematic sectional view of a trilaminate film having differential slip characteristics.
Figure 3:
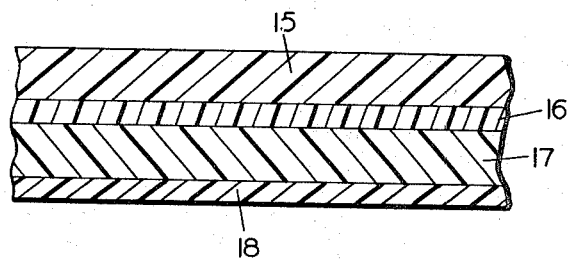
FIG. 3 is a schematic sectional view of a four laminae film having differential slip characteristics.

FIG. 2 illustrates a trilaminate film construction wherein lamina 12 is the high slip lamina, lamina 14 is the low slip lamina, and lamina 13 is the intermediate lamina.

An example of a particularly advantageous trilaminate film construction is one wherein polypropylene forms the high slip laminae, ethylene-vinyl acetate forms the low slip laminae, and polyethylene forms the intermediate laminae.

FIG. 3 illustrates a multilaminate film having four laminae wherein 15 is the high slip lamina, 16 is a lamina which promotes adhesion between lamina 15 and lamina 17, and lamina 18 is the outer lamina having low slip characteristics.

An example of a multilaminate film having four laminae is one wherein polypropylene forms the high slip laminae, polyethylene forms one of the intermediate laminae with a copolymer of ethylene-vinyl acetate forming a lamina in-between the polyethylene and the polypropylene laminae, and ethylene-vinyl acetate copolymer forms the outer lamina having an outer surface exhibiting low slip characteristics.

The following example illustrates a trilaminaee film construction.

EXAMPLE 1

A trilaminate film construction such as that illustrated in FIG. 2 is formed which has about 62% by weight low density polyethylene (Spencer 5555), about 35% by weight polypropylene (Hercules PA953) and about 3% by weight ethylene-vinyl acetate copolymer (Du Pont 3170). The polypropylene contains 0.075 by weight erucyl amide as a slip additive and 0.075 by weight diatomaceous earth as an antiblock agent. The over-all film thickness is 1 mil. The static coefficient of friction of the outer surface of the polypropylene layer is 0.3 to 0.4, and the static coefficient of friction of the outer surface of the ethylene-vinyl acetate layer is greater than 2.0 off scale, and not measurable. The optical properties of the multilaminate thermoplastic film are good, the gloss being about 80 as measured by a Gardner haze meter with a 45° gloss head attachment and a film haze of about 2.8 as measured by a Gardner haze meter. The film had a room temperature (73° F.) dart impact strength of 150 grams ($F_{50}$ @ 8¾″), and a low temperature (20° F.) dart impact strength of 90 grams. The heat seal strength of 280° F. was between 100 and 200 grams per inch width per 12 inches per minute. This film was employed to package bread on several different AMF bread wrapping machines (Models 3–22, 3–121, 3–175, and 3–175R) at packaging rates of from 40 to 60 packages a minute for different types of bread and buns. Total rewraps were less than ½% and many of those were rewrapped for reasons other than film problems such as end labels or outsert band problems. Excellent bottom lap seals were obtained on all types of machines over a wide range of bottom seal temperatures (240° to 280° F.).

In the trilaminate film construction described in the foregoing Example 1, any suitable conventional pigment may be incorporated therein. It has been found to be advantageous to add such pigments to the polyethylene layer since there is practically no pigment migration to the outside layers where pigment migration is a problem with some colorants due to the detrimental effects of build-up of the colorant on the die extrusion lips. For example, transparent Tango orange film has been produced by adding 7 lbs. of a concentrate containing 12½% Tango orange colorant per 100 lbs. polyethylene to produce an orange-colored multilaminate thermoplastic film. A white opaque film has been produced by adding 15% by weight titanium dioxide pigment to the polyethylene layer.

In the trilaminate construction described in the foregoing Example 1, the polypropylene layer should comprise a minimum of about 10% to 15% by weight of the over-all film composition, and preferably from about 35% to 60% by weight. Below about 10%, the advantages of polypropylene characteristics are not as readily obtainable. The upper limit is determined principally by economic considerations.

The ethylene-vinyl acetate lamina of the trilaminate film construction described in the foregoing Example 1 should be present in amounts of from about 1% to about 10% by weight, and preferably about 2% to 4% for bread wrap films. If a higher heat seal strength is desirable, from 4% to 10% should be employed. With 3% by weight ethylene-vinyl acetate copolymer present in the multiaminate film construction, a heat seal strength of about 100 to 150 grams is obtained, which is sufficient for bread wrap applications. With 10% by weight a heat seal strength of about 400 grams is obtained. It has been found that the amount of vinyl acetate monomer present in the copolymer should not exceed about 18% by weight because above this amount extrusion problems present themselves. There should be present, however, a very minimum of about 10% to 12% acetate monomer in the copolymer in order to get good heat seal strength.

It has sometimes been found to be desirable to add small amounts of slip additive and antiblock agent to the ethylene-vinyl acetate layer to overcome film feeding difficulties experienced on some bread wrapping machines due to the high tackiness of the lamina. The amount employed should not be so great as to destroy the slip differential necessary for obtaining good machinability in the wrapping machine, and the optimum amount for a particular machine is readily determinable. While such modification of the low slip lamina does not destroy the necessary slip differential of the film, as it exists in the wrapping machinery, it does appear to modify the surface characteristics of this lamina with respect to measuring the slip differential with the standard slip test described previously. For reasons that are not clearly understood, the slip differential of the ethylene-vinyl acetate lamina containing slip additive is not always measurable by employing the standard slip test, even though it is apparent by feeling the film with your fingers, and by rubbing one side of the film against the other, that a substantial slip differential does, in fact, exist. A modified slip test was devised to measure the slip differential. Since the film exhibited slip differential in bread wrapping machines, the conditions that exist in the bakery were imitated. Bakeries are normally warm, and the film is unwound from tightly wound rolls where it is under pressure. Samples of trilaminate film having slip additive in the ethylene-vinyl acetate layer were placed in pairs (with high slip side to high slip side and low slip side to low slip side) into a mechanical press under 35 p.s.i. overnight in a constant temperature-constant humidity room maintained at 100° F. and 12% relative humidity. An area of 3 inches by 5 inches of each sample pair was exposed to the pressure of the press. The samples were then removed from the press, and the film layers separated. Slip tests were run on the Thwing-Albert Egan slip tester, the slip being measured in the area of each sample pair that had been exposed to the pressure of the press. This modified test gave results very close to those obtained by the standard slip test on the acetate lamina containing no slip additive, as recorded in Example 1. The static coefficient of friction of the high slip or polypropylene side was about 0.36, and the static coefficient of friction of the low slip or ethylene-vinyl acetate side was over 2.0 (off scale). It appears from these results that the differential slip of this particular film configuration is at least partially latent, and only fully developed under bread wrapping operating conditions.

As is seen from the foregoing Example 1, the outer surface of the polypropylene lamina has a high slip as indicated by the coefficient of friction measurement and is in the neighborhood of 0.3 to 0.4. When the outer surface of the polypropylene layer is contacted with the bread wrapping machinery surfaces, this high slip permits the overwrapped bread loaf to travel through the machine with a minimum of friction, which minimizes the tendency for pull-back of end folds. The other outer surface formed by the ethylene-vinyl acetate copolymer lamina exhibits low slip characteristics as indicated by the high coefficient of friction. The tacky nature of the outer surface of the copolymer lamina enables the bottom lap and end folds to be held in place as the overwrapped bread moves through the packaging machinery and, therefore, also minimizes the tendency for pull-back of end folds and bottom lap.

In addition to holding the overlapped folds in place, the ethylene-vinyl acetate copolymer also enables the polyethylene inner lamina to be heat sealed to the polypropylene outer lamina, since these materials do not readily heat seal to one another. The low melting temperature of the ethylene-vinyl acetate copolymer combined with the high melting temperature of the polypropylene lamina gives an increase in the heat seal temperature range of the multilaminate film over that of a straight polyethylene or polypropylene homopolymer film. Thus, the danger that burn-through or lack of good heat seal will occur is greatly minimized.

For the trilaminate film construction it has been found desirable to use a polypropylene homopolymer with a melt flow in the 8 to 15 (grams per 10 minute) range. While either a low or medium density polyethylene homopolymer may be employed for the inner lamina in the trilaminate film construction, it has been found desirable to employ a polyethylene homopolymer with a density in the range of 0.925 to 0.935 and having a melt flow of 1.75 to 2.5, although polyethylenes having a melt flow up to about 4.0 may be employed.

The polypropylene homopolymer employed in the trilaminate film construction gives the multilaminate film a stiffness which low density polyethylene by itself does not possess. However, the low density polyethylene employed in the multilaminate film construction imparts to the over-all film good low temperature impact strength which polypropylene by itself does not possess. Thus, the film is an all-weather film and may be employed in either hot or cold climates. The following table compares the low temperature impact strength of the trilaminate film construction of foregoing Example 1 with polypropylene homopolymer and polyethylene homopolymer:

TABLE I.—IMPACT STRENGTHS COMPARED

| 1 mil film: | Dart impact strength at 20° F. (8¾″) |
|---|---|
| Polyethylene (medium density) | 109 grams. |
| Polypropylene | 100% failure at 28 grams. |
| Trilaminate construction of Example 1 | 90 grams. |

It is thus seen from the foregoing table that the trilaminate film construction has an exceptionally better low temperature impact strength than polypropylene, and is almost as good as a wholly polyethylene film.

Summarizing the advantageous properties of the trilaminate film construction as a breadwrapping film over that of polyethylene or polypropylene homopolymers, it is seen that thin films on the order of 1 mil in thickness have a stiffness that is better than a 1 mil low density polyethylene film due to the presence of the polypropylene lamina, it has a better low temperature impact strength than polypropylene alone due to the presence of the other lamina present, and it has a broader heat seal temperature range than either polyethylene or polypropylene as well as having one surface which has high slip characteristics for improved passage through bread wrapping machinery and having the other surface with a low slip which holds the overlapped bottom seam and the end folds in position as the wrapped loaf traverses the wrapping machinery.

EXAMPLE 2

This example illustrates a bilaminate film construction such as that illustrated in FIG. 1. The bilaminate film is comprised of 85% by weight medium density polyethylene (Union Carbide 4709 or Spencer TDX-3107) and 15% by weight low density polyethylene (Spencer 5555). The medium density polyethylene contains 0.075% by weight erucyl amide as a slip additive and 0.075% by weight diatomaceous earth as an antiblock agent. The low density polyethylene lamina contains no slip additive. The bilaminate film was compared with a standard polyethylene bread wrap film produced from medium density polyethylene containing 0.075% slip additive and 0.075% antiblock agent for the overwrapping of bread on an AMF 3-175 bread wrapping machine. The properties of the bilaminate film of this example and the standard polyethylene film are compared in the following table:

TABLE II.—PROPERTIES COMPARED

| | Bilaminate film of Ex. 2 | Standard polyethylene film |
|---|---|---|
| 1. Thickness, mil | 0.92 | 1.0 |
| 2. Density, gms./cc | 0.9245 | 0.927 |
| 3. Coefficient of friction: | | |
|    a High slip side | 0.34-0.42 | 0.40 |
|    b Low slip side | 2.0 | 0.40 |
| 4. Gloss | 77-81 | 77-81 |
| 5. Haze | 3.0 | 3.0 |

The differential slip bilaminate film was run with the tacky side (low density) contacting the bread and the high slip side (medium density) contacting the folding line. A very soft and difficult loaf of bread to wrap was wrapped at the rate of 50 loaves per minute. Even though the bilaminate film was lower in density and thinner and, therefore, lower in stiffness, it performed well and produced a tighter package with tighter end folds than with the standard polyethylene bread wrap. When the same bread was wrapped at the same rate with the standard polyethylene bread wrap film, there was some end fold slippage with dog-eared packages resulting.

In the construction of foregoing Example 2, the medium density polyethylene may be present in amounts ranging from about 50% to about 90% by weight and the low density polyethylene present as the balance.

Various modifications which are intended to be included within the scope of the following claims will be apparent to those skilled in the art.

What is claimed is:

1. A thermoplastic film having a difference in slip characteristics between the two outer surfaces thereof, said film comprising at least three laminae:
   the first outer lamina thereof being a polyolefin selected from the group consisting of polyethylene, polypropylene and ethylene-propylene copolymers, having sufficient slip additive incorporated therein to impart to the outer surface of said first outer lamina a static coefficient of friction of less than about 0.5;
   the second outer lamina comprising a thermoplastic resin selected from the group consisting of polyethylene and a copolymer of ethylene and vinyl acetate wherein the vinyl acetate content of said copolymer is between about 10% and about 18%, by weight of the copolymer, said second outer lamina having a static coefficient of friction at its outer surface at least about 0.4 greater than that of the surface of said first outer lamina, the thermoplastic film lamina intermediate to the first and second outer laminae being bonded to the laminae adjacent thereto.

2. The thermoplastic film of claim 1, wherein said lamina intermediate to the first and second outer laminae is selected from the group consisting of polyethylene, polypropylene, ethylene-propylene copolymers and copolymers of ethylene or propylene with a monomer selected from the group consisting of vinyl acetate, methyl acrylate and methyl methacrylate.

3. The film of claim 1, wherein the total film thickness is approximately 1 mil.

4. A thermoplastic film having a difference in slip characteristics between the two outer surfaces thereof, said film comprising three laminae:
   a first outer lamina thereof comprising polypropylene having sufficient slip additive incorporated therein to impart to the outer surface thereof a static coefficient of friction less than about 0.5;
   a second outer lamina thereof comprising a copolymer of ethylene and vinyl acetate wherein the vinyl acetate content of said copolymer is between about 10% and about 18% by weight of the copolymer, said second outer lamina having an outer surface which has a static coefficient of friction at least about 0.4 greater than that of the outer surface of said first outer lamina;

and a third lamina of polyethylene intermediate said first and second laminae and being bonded to the laminae adjacent thereto.

5. The film of claim 4 wherein the total film thickness is approximately 1 mil.

6. A thermoplastic film having a difference in slip characteristics between the two outer surfaces thereof, said film comprising three laminae:

a first outer lamina comprising polypropylene having sufficient slip additive and antiblock agent incorporated therein to impart to the outer surface thereof a static coefficient of friction less than about 0.5, said first lamina comprising from about 35% to 60% by weight of the film;

a second outer lamina thereof comprising a copolymer of ethylene and vinyl acetate wherein the vinyl acetate content of said copolymer is between about 10% and about 18% by weight of the copolymer, said second outer lamina having a static coefficient of friction at its outer surface at least about 0.4 greater than that of the outer surface of said first outer lamina, said second outer lamina comprising from about 1% to 10% by weight of the film;

and a third lamina of polyethylene intermediate said first and second laminae, said third lamina constituting the balance of the film composition and being bonded to the laminae adjacent thereto.

7. The film of claim 6 wherein the total film thickness is approximately 1 mil.

References Cited

UNITED STATES PATENTS

| | | | |
|---|---|---|---|
| 2,983,704 | 5/1961 | Rodel | 161—252 |
| 3,262,808 | 7/1966 | Crooks et al. | |
| 3,340,091 | 9/1967 | Zweig. | |
| 3,176,021 | 3/1965 | Volungis et al. | |
| 3,246,831 | 4/1966 | Teicher | 229—53 |
| 3,330,796 | 7/1967 | Mock et al. | |
| 3,376,275 | 4/1968 | Bayerkin et al. | |
| 3,232,789 | 2/1966 | Pelzek et al. | |
| 3,165,492 | 1/1965 | Tholstup et al. | |
| 3,223,761 | 12/1965 | Raley | 264—95 |
| 3,380,844 | 4/1968 | Menikheim et al. | |
| 3,438,825 | 4/1969 | Fidler. | |

OTHER REFERENCES

Jordan: "Laminated and Coated Polyolefin Films," Plastics World, April 1964, pp. 56 and 57 cited.

ROBERT F. BURNETT, Primary Examiner

R. J. ROCHE, Assistant Examiner

U.S. Cl. X.R.

161—252, 254; 117—138.8, 161; 229—3.5, 87